US012784693B2

United States Patent

Fang et al.

(12) United States Patent
(10) Patent No.: US 12,784,693 B2
(45) Date of Patent: Nov. 3, 2026

(54) DISPLAY PANEL, DRIVING METHOD THEREOF AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Fei Fang, Beijing (CN); Ling Shi, Beijing (CN); Yipeng Chen, Beijing (CN); Weifeng Zhou, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 19/146,946

(22) PCT Filed: Jun. 12, 2024

(86) PCT No.: PCT/CN2024/098626

§ 371 (c)(1),
(2) Date: Jul. 10, 2025

(87) PCT Pub. No.: WO2025/020733

PCT Pub. Date: Jan. 30, 2025

(65) Prior Publication Data

US 2026/0221099 A1 Jul. 30, 2026

(30) Foreign Application Priority Data

Jul. 27, 2023 (CN) ........................ 202310934555.2

(51) Int. Cl.
*G09G 3/20* (2006.01)
*G09G 3/3266* (2016.01)

(52) U.S. Cl.
CPC ... *G09G 3/3266* (2013.01); *G09G 2300/0819* (2013.01); *G09G 2310/0286* (2013.01);
(Continued)

(58) Field of Classification Search
CPC ............. G09G 3/20; G09G 2300/0439; G09G 2310/0202; G09G 2310/0243;
(Continued)

(56) References Cited

U.S. PATENT DOCUMENTS 7,663,651 B2 * 2/2010 Itoh .......................... G09G 3/30 345/55
10,152,923 B2 * 12/2018 Li ........................ G09G 3/3233
11,594,160 B2 * 2/2023 Sun ........................ G09G 3/006
(Continued)

FOREIGN PATENT DOCUMENTS

CN 106531767 A 3/2017
CN 108010934 A 5/2018
(Continued)

OTHER PUBLICATIONS

CN202310934555.2 First Office Action dated Dec. 31, 2025.

*Primary Examiner* — Olga V Merkoulova
(74) *Attorney, Agent, or Firm* — IPro, PLLC

(57) ABSTRACT

A display panel includes a plurality of pixel units arranged in an array. Each pixel unit includes at least a first light-emitting element, two second light-emitting elements, and a third light-emitting element which are different in color. A plurality of pixel circuits correspond to the first light-emitting element, the second light-emitting elements, and the third light-emitting element in the pixel unit, respectively, and in the first light-emitting elements and the third light-emitting elements in any two adjacent odd columns, in one of the two adjacent odd columns, the pixel circuit corresponding to an $n^{th}$ light-emitting element is electrically connected to an $(n+1)^{th}$ light-emitting element, and the pixel
(Continued)

circuit corresponding to an $(n+1)^{th}$ light-emitting element is electrically connected to the $n^{th}$ light-emitting element, where n is an odd number.

20 Claims, 7 Drawing Sheets

(52) U.S. Cl.
CPC ............... *G09G 2320/0247* (2013.01); *G09G 2330/021* (2013.01)

(58) Field of Classification Search
CPC ....... G09G 2310/0264; G09G 2320/02; G09G 2320/0233
See application file for complete search history.

(56) References Cited

U.S. PATENT DOCUMENTS

| | | | | |
|---|---|---|---|---|
| 2007/0057960 | A1* | 3/2007 | Itoh | G09G 5/39 345/589 |
| 2016/0027396 | A1 | 1/2016 | Li et al. | |
| 2016/0056213 | A1* | 2/2016 | Kwak | G09G 3/3233 315/161 |
| 2016/0189593 | A1* | 6/2016 | Lee | G09G 3/003 438/4 |
| 2017/0270868 | A1* | 9/2017 | Li | G09G 3/2003 |
| 2021/0090480 | A1* | 3/2021 | Sun | G09G 3/006 |
| 2024/0203314 | A1* | 6/2024 | Hou | G09G 3/3208 |

FOREIGN PATENT DOCUMENTS

| | | | |
|---|---|---|---|
| CN | 110783373 | A | 2/2020 |
| CN | 110808005 | A | 2/2020 |
| CN | 113314063 | A | 8/2021 |
| CN | 218158982 | U | 12/2022 |
| CN | 116386496 | A | 7/2023 |
| CN | 116863857 | A | 10/2023 |

* cited by examiner

DISPLAY PANEL, DRIVING METHOD THEREOF AND DISPLAY APPARATUS

CROSS-REFERENCE TO RELATED APPLICATION

This is a National Phase Application filed under 35 U.S.C. 371 as a national stage of PCT/CN2024/098626, filed on Jun. 12, 2024, an application claiming the benefit of Chinese Application No. 202310934555.2 filed on Jul. 27, 2023, the content of each of which is hereby incorporated by reference in its entirety.

TECHNICAL FIELD

Embodiments of the present disclosure belong to the field of display technology, and specifically relate to a display panel, a driving method thereof, and a display apparatus.

BACKGROUND

As a novel display product, the organic light-emitting diode (OLED) has the advantages of rich colors, fast response, foldability, and the like, and is gradually replacing the liquid crystal display (LCD) and becoming the mainstream of medium and small sizes of display products. With the further development of the OLED, the market has higher and higher requirements on the OLED, such as on the lifetime, power consumption, and high brightness mode.

SUMMARY

In a first aspect, an embodiment of the present disclosure provides a display panel, including a plurality of pixel units arranged in an array;

each pixel unit includes at least a first light-emitting element, two second light-emitting elements, and a third light-emitting element which are different in color;

the second light-emitting elements in the pixel unit are in a same odd row and different even columns, and the first light-emitting element and the third light-emitting element are in a same even row and different odd columns, in the array of the pixel units, first light-emitting elements and third light-emitting elements in any two adjacent even rows are mutually staggered, and first light-emitting elements and third light-emitting elements in any two adjacent odd columns are mutually staggered, first light-emitting elements and third light-emitting elements in a same column are electrically connected to a same data line; second light-emitting elements in a same column are electrically connected to a same data line;

the pixel unit further includes a plurality of pixel circuits correspond to the first light-emitting element, the second light-emitting elements, and the third light-emitting element in the pixel unit, respectively, and in the first light-emitting elements and the third light-emitting elements in any two adjacent odd columns, in one of the two adjacent odd columns, the pixel circuit corresponding to an $n^{th}$ light-emitting element is electrically connected to an $(n+1)^{th}$ light-emitting element, and the pixel circuit corresponding to an $(n+1)^{th}$ light-emitting element is electrically connected to the $n^{th}$ light-emitting element, where n is an odd number; and the $n^{th}$ light-emitting element is the first light-emitting element or the third light-emitting element, and the $(n+1)^{th}$ light-emitting element is the third light-emitting element or the first light-emitting element.

In some embodiments, the plurality of pixel circuits correspond to the first light-emitting element, the two second light-emitting elements, and the third light-emitting element in the pixel unit one by one, and in the second light-emitting elements in any two adjacent even columns, in one of the two adjacent even columns, the pixel circuit corresponding to an $n^{th}$ second light-emitting element is electrically connected to an $(n+1)^{th}$ second light-emitting element, and the pixel circuit corresponding to an $(n+1)^{th}$ second light-emitting element is electrically connected to the $n^{th}$ second light-emitting element, where n is an odd number.

In some embodiments, the array of the pixel units in a display region includes X rows, where X≥8, and the display region is divided into A subregions sequentially arranged in a column direction of the array, each subregion including at least four rows of pixel units, where A is any integer in a range of 1 to X/4.

In some embodiments, the display panel further includes at least one emission control driver circuit in at least one side frame region, and different emission control driver circuits are electrically connected to corresponding pixel circuits in different subregions, the emission control driver circuit includes a plurality of first shift registers in which odd first shift registers are sequentially cascaded, even first shift registers are sequentially cascaded, and an output of a last odd first shift register is electrically connected to an input of a first even first shift register, outputs of the odd first shift registers are electrically connected to the pixel circuits in the pixel units in odd rows, outputs of the even first shift registers are electrically connected to the pixel circuits in the pixel units in even rows; and an output of a last first shift register in a previous emission control driver circuit of two adjacent emission control driver circuits is electrically connected to an input of a first first shift register in a next emission control driver circuit.

In some embodiments, in the emission control driver circuit, an output of an $N^{th}$ first shift register is electrically connected to the pixel circuits in the pixel units in $(2N-1)^{th}$ and $(2N+1)^{th}$ rows of the corresponding subregion, where N is an odd number; and an output of an $M^{th}$ first shift register is electrically connected to the pixel circuits in the pixel units in $(2M-2)^{th}$ and $(2M)^{th}$ rows of the corresponding subregion, where M is an even number.

In some embodiments, an input of a first first shift register in a first emission control driver circuit is electrically connected to an emission control trigger signal output.

In some embodiments, the display panel further includes at least one gate driver circuit in at least one side frame region, and different gate driver circuits are electrically connected to corresponding pixel circuits in different subregions, the gate driver circuit includes a plurality of second shift registers in which odd second shift registers are sequentially cascaded, even second shift registers are sequentially cascaded, and an output of a last odd second shift register is electrically connected to an input of a first even second shift register, outputs of the odd second shift registers are electrically connected to the pixel circuits in the pixel units in odd rows, outputs of the even second shift registers are electrically connected to the pixel circuits in the pixel units in even rows; and an output of a last second shift register in a previous gate driver circuit of two adjacent gate driver circuits is electrically connected to an input of a first second shift register in a next gate driver circuit.

In some embodiments, in the gate driver circuit, an output of an $N^{th}$ second shift register is electrically connected to the pixel circuits in the pixel units in $(2N-1)^{th}$ and $(2N+1)^{th}$ rows of the corresponding subregion, where N is an odd number; and an output of an $M^{th}$ second shift register is electrically connected to the pixel circuits in the pixel units in $(2M-2)^{th}$ and $(2M)^{th}$ rows of the corresponding subregion, where M is an even number.

In some embodiments, an input of a first second shift register in a first gate driver circuit is electrically connected to a gate drive trigger signal output.

In some embodiments, the gate driver circuit includes a first gate driver circuit, a second gate driver circuit, and a third gate driver circuit;

an input of a first second shift register in a first first gate driver circuit is electrically connected to a first gate drive trigger signal output;

an input of a first second shift register in a first second gate driver circuit is electrically connected to a second gate drive trigger signal output; and an input of a first second shift register in a first third gate driver circuit is electrically connected to a third gate drive trigger signal output.

In some embodiments, the display panel further includes at least a pair of fourth gate driver circuits in two opposite side frame regions, and different fourth gate driver circuits in the same side frame region are electrically connected to corresponding pixel circuits in different subregions, each fourth gate driver circuit includes a plurality of third shift registers in which odd third shift registers are sequentially cascaded, even third shift registers are sequentially cascaded, and an output of a last odd third shift register is electrically connected to an input of a first even third shift register, outputs of the odd third shift registers are electrically connected to the pixel circuits in the pixel units in odd rows, outputs of the even third shift registers are electrically connected to the pixel circuits in the pixel units in even rows; and an output of a last third shift register in a previous fourth gate driver circuit of two adjacent fourth gate driver circuits in the same side frame region is electrically connected to an input of a first third shift register in a next fourth gate driver circuit.

In some embodiments, in each fourth gate driver circuit, an output of an $N^{th}$ third shift register is electrically connected to the pixel circuits in the pixel units in an $N^{th}$ row of the corresponding subregion, where N is an odd number; and an output of an $M^{th}$ third shift register is electrically connected to the pixel circuits in the pixel units in an $M^{th}$ row of the corresponding subregion, where M is an even number.

In some embodiments, an input of a first third shift register in a first fourth gate driver circuit in the same side frame region is electrically connected to a fourth gate drive trigger signal output.

In some embodiments, each of the first light-emitting element, the second light-emitting element, and the third light-emitting element includes an anode, an emission functional layer and a cathode sequentially arranged in a superimposed manner, each pixel circuit includes a first transistor, a second transistor, a third transistor, a fourth transistor, a fifth transistor, a sixth transistor, a seventh transistor, a drive transistor, a first capacitor and a second capacitor, a first electrode of the first transistor, a first electrode of the second transistor, a first electrode of the sixth transistor, and a first electrode of the drive transistor are connected at a third node, a second electrode of the first transistor, a first electrode of the fifth transistor, a first plate of the first capacitor, and a first plate of the second capacitor are connected at a first node, a second plate of the second capacitor, a gate of the drive transistor, and a first electrode of the fourth transistor are connected at a second node, a first electrode of the seventh transistor, a first electrode of the third transistor, and the anode are connected at a fourth node, a second electrode of the second transistor and a second plate of the first capacitor are connected to a first power, a second electrode of the fifth transistor is connected to the corresponding data line, a second electrode of the sixth transistor is connected to a third reset power, a second electrode of the fourth transistor is connected to a second reset power, a second electrode of the drive transistor is connected to a second electrode of the seventh transistor, a second electrode of the third transistor is connected to a first reset power, and the cathode is connected to a second power;

a gate of the first transistor and a gate of the fourth transistor are connected to the first gate driver circuit, a gate of the third transistor is connected to the second gate driver circuit, a gate of the sixth transistor and a gate of the seventh transistor are connected to the third gate driver circuit, a gate of the second transistor is connected to the emission control driver circuit, and a gate of the fifth transistor is connected to the fourth gate driver circuits.

In some embodiments, the first light-emitting element includes a first anode, the third light-emitting element includes a third anode, and the first anode and the third anode are in a same layer, the fourth node of the pixel circuit corresponding to an $n^{th}$ first light-emitting element is connected to the third anode of an $(n+1)^{th}$ third light-emitting element through a first lead, and the fourth node of the pixel circuit corresponding to the $(n+1)^{th}$ third light-emitting element is connected to the first anode of the $n^{th}$ first light-emitting element through a second lead.

In some embodiments, each pixel circuit includes a plurality of conductive layers, and the first lead and the second lead are in a same layer and in any one of the conductive layers.

In some embodiments, each second light-emitting element includes a second anode in the same layer as the first anode and the third anode, the fourth node of the pixel circuit corresponding to an $n^{th}$ second light-emitting element is connected to the second anode of an $(n+1)^{th}$ second light-emitting element through a third lead, and the fourth node of the pixel circuit corresponding to an $(n+1)^{th}$ second light-emitting element is connected to the second anode of an $n^{th}$ second light-emitting element through a fourth lead.

In some embodiments, the third and fourth leads are in the same layer as the first and second leads, and the first, second, third and fourth leads each extend in the column direction of the array, and are sequentially arranged in a row direction of the array.

In a second aspect, an embodiment of the present disclosure further provides a display apparatus, including the display panel as described above.

In a third aspect, an embodiment of the present disclosure further provides a driving method for the display panel described above, including: dividing a display region into A subregions, wherein A is any integer in a range of 1 to X/4, X is a total number of rows in an array of pixel units in the display region, and X≥8, and the driving method includes sequentially driving the pixel units in each subregion to display, when the pixel units in each subregion are driven to display, the pixel units in odd rows are scanned during a previous (1/2A) frame, data signals for driving a first light-emitting element to emit light are input to odd data lines, and data signals for driving a second light-emitting element to emit light are input to even data lines; and the pixel units in even rows are scanned during a next (1/2A) frame, data signals for driving a third light-emitting element to emit light are input to odd data lines, and data signals for driving the second light-emitting element to emit light are input to even data lines.

BRIEF DESCRIPTION OF DRAWINGS

Accompanying drawings are provided for further understanding of the embodiments of the present disclosure and constitute a part of the specification. Hereinafter, these drawings are intended to explain the present disclosure together with the following embodiments, but should not be considered as a limitation to the present disclosure. The above and other features and advantages will become more apparent to those skilled in the art by describing in detail exemplary embodiments thereof with reference to the attached drawings, in which.

DETAIL DESCRIPTION OF EMBODIMENTS

Figure 1:
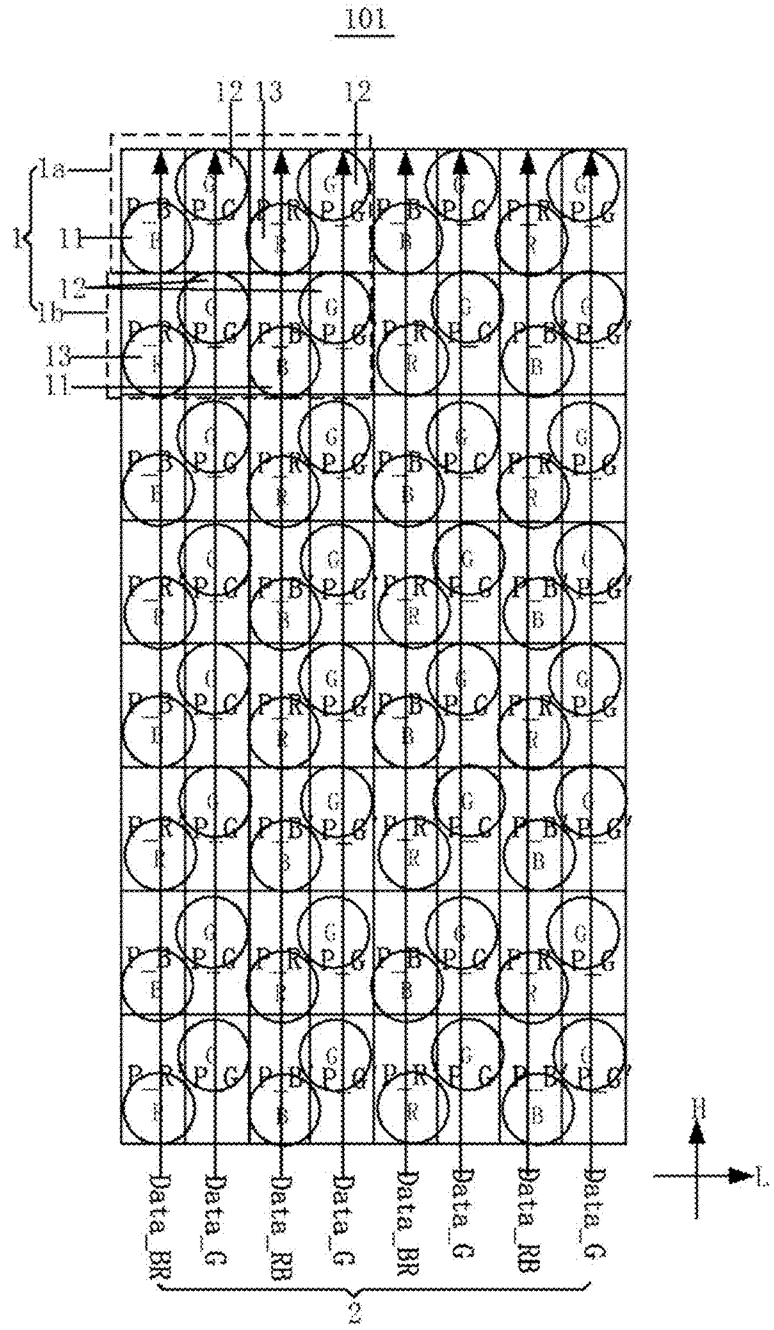
FIG. 1 is a schematic top view illustrating an arrangement of pixel units in a display region of a display panel according to an embodiment of the present disclosure.

In order to make those skilled in the art better understand the technical solutions in the embodiments of the present disclosure, the display panel, the driving method thereof and the display apparatus provided in the embodiments of the present disclosure will be described in further detail below with reference to the accompanying drawings and specific implementations.

Embodiments of the present disclosure will be described more sufficiently below with reference to the accompanying drawings, which may be embodied in different forms and should not be construed as being limited to the embodiments set forth herein. Rather, these embodiments are provided so that the present disclosure will be thorough and complete, and will fully convey the scope of the present disclosure to those skilled in the art.

The embodiments of the present disclosure are not limited to the embodiments shown in the drawings, but further include modifications of configurations formed based on a manufacturing process. Thus, the regions illustrated in the figures have schematic properties, and the shapes of the regions shown in the figures illustrate specific shapes of regions, but are not intended to be limitative.

An embodiment of the present disclosure provides a display panel. Referring to FIG. 1, a schematic top view illustrating an arrangement of pixel units in a display region of a display panel according to an embodiment of the present disclosure is shown. The display panel includes a plurality of pixel units 1 arranged in an array in a display region 101; and a plurality of data lines 2. Each pixel unit 1 includes a first light-emitting element 11, two second light-emitting elements 12, and a third light-emitting element 13 which are different in color.

The plurality of pixel units 1 include a plurality of first pixel units 1*a* and a plurality of second pixel units 1*b*. The plurality of first pixel units 1*a* are located in odd rows and arranged in a row direction L of the array. The plurality of second pixel units 1*b* are located in even rows and arranged in the row direction L of the array. In each first pixel unit 1*a*, the first light-emitting element 11, one second light-emitting element 12, the third light-emitting element 13, and the other second light-emitting element 12 are sequentially arranged in the row direction L, and in each second pixel unit 1*b*, the third light-emitting element 13, one second light-emitting element 12, the first light-emitting element 11, and the other second light-emitting element 12 are sequentially arranged in the row direction L.

First light-emitting elements 11 and the third light-emitting elements 13 are alternated in sequence in a column direction H of the array, and the first light-emitting elements 11 and the third light-emitting elements 13 in the same column are electrically connected to the same data line 2. Second light-emitting elements 12 are sequentially arranged in the column direction H of the array, and the second light-emitting elements 12 in the same column are electrically connected to the same data line 2.

The first pixel unit 1*a* further includes a plurality of first pixel circuits in one-to-one correspondence with and electrically connected to the first light-emitting element 11, the second light-emitting elements 12, and the third light-emitting element 13 in the first pixel unit 1*a*. The second pixel unit 1*b* further includes a plurality of second pixel circuits in one-to-one correspondence with and electrically connected to the first light-emitting element 11, the second light-emitting elements 12, and the third light-emitting element 13 in the second pixel unit 1*b*.

In some embodiments, the first light-emitting element 11 is a blue light-emitting element B, the second light-emitting element 12 is a green light-emitting element G, and the third light-emitting element 13 is a red light-emitting element R. Blue light-emitting elements B and red light-emitting elements R in the same column are electrically connected to the same data line Data_BR/Data_RB, and green light-emitting elements G in the same column are electrically connected to the same data line Data_G. First pixel circuits P_B, P_G and P_R are respectively in one-to-one correspondence with and electrically connected to the blue light-emitting element B, the green light-emitting elements G, and the red light-emitting element R in the first pixel unit 1*a*. Second pixel circuits P_B', P_G' and P_R' are respectively in one-to-one correspondence with and electrically connected to the first light-emitting element 11, the second light-emitting elements 12, and the third light-emitting element 13 in the second pixel unit 1*b*.

Referring to the arrangement of pixel units in FIG. 1, data signals are written to the blue light-emitting element B and the red light-emitting element R via the data line Data_BR/Data_RB connected to the light-emitting elements in odd columns, and data signals are written to the green light-emitting element G via the data line Data_G connected to the light-emitting elements in even columns. Since the blue light-emitting elements B and the red light-emitting elements R are alternated in odd columns, data signals of the light-emitting elements in odd columns will jump when written line by line. In other words, data signals of the light-emitting elements in odd columns will cause continuous jumps of the data signals of the blue light-emitting element B and the red light-emitting element R along with progressive scanning by a gate driver circuit. Since the data signals of the blue light-emitting element B and the red light-emitting element R are in different ranges, a data driver chip is required to charge and discharge the light-emitting elements in odd columns constantly, causing increased power consumption of the display panel.

Figure 2A:
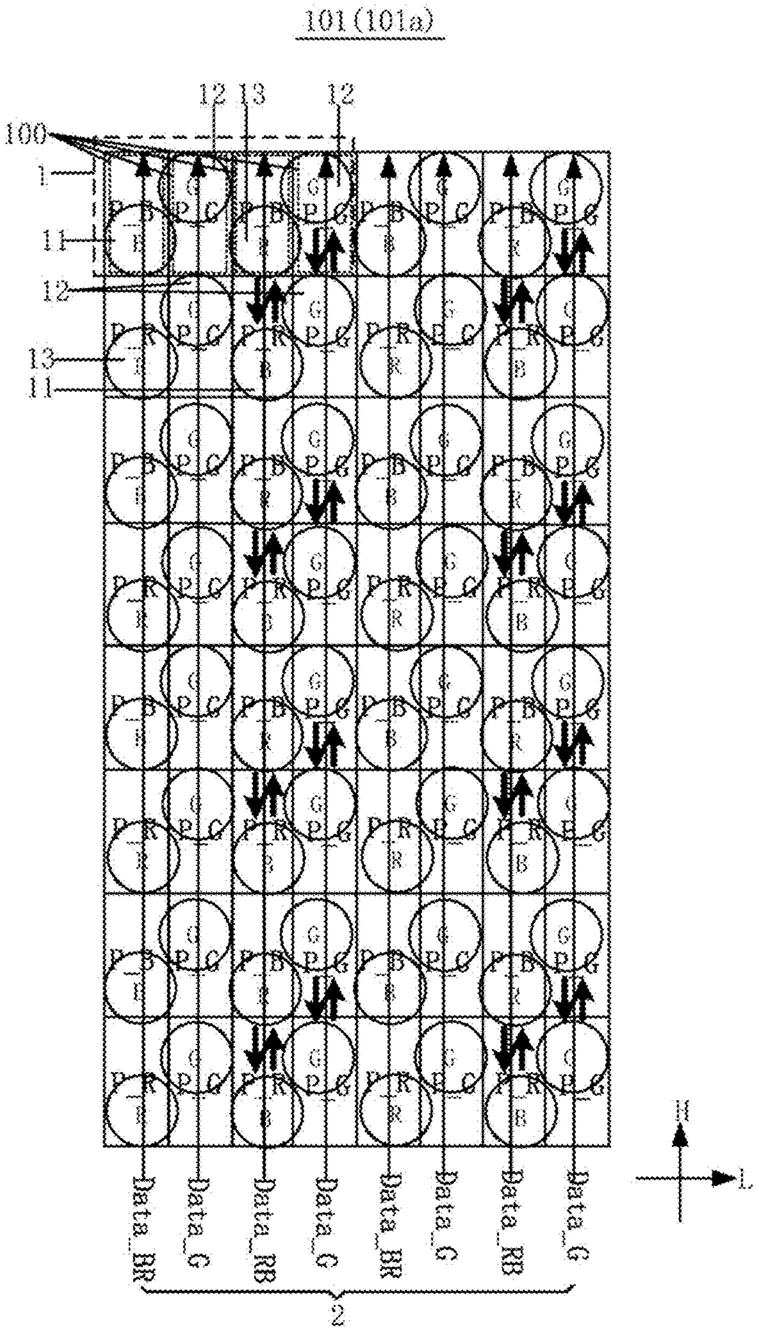
FIG. 2A is a schematic top view of a display region of another display panel according to an embodiment of the present disclosure.
Figure 2B:
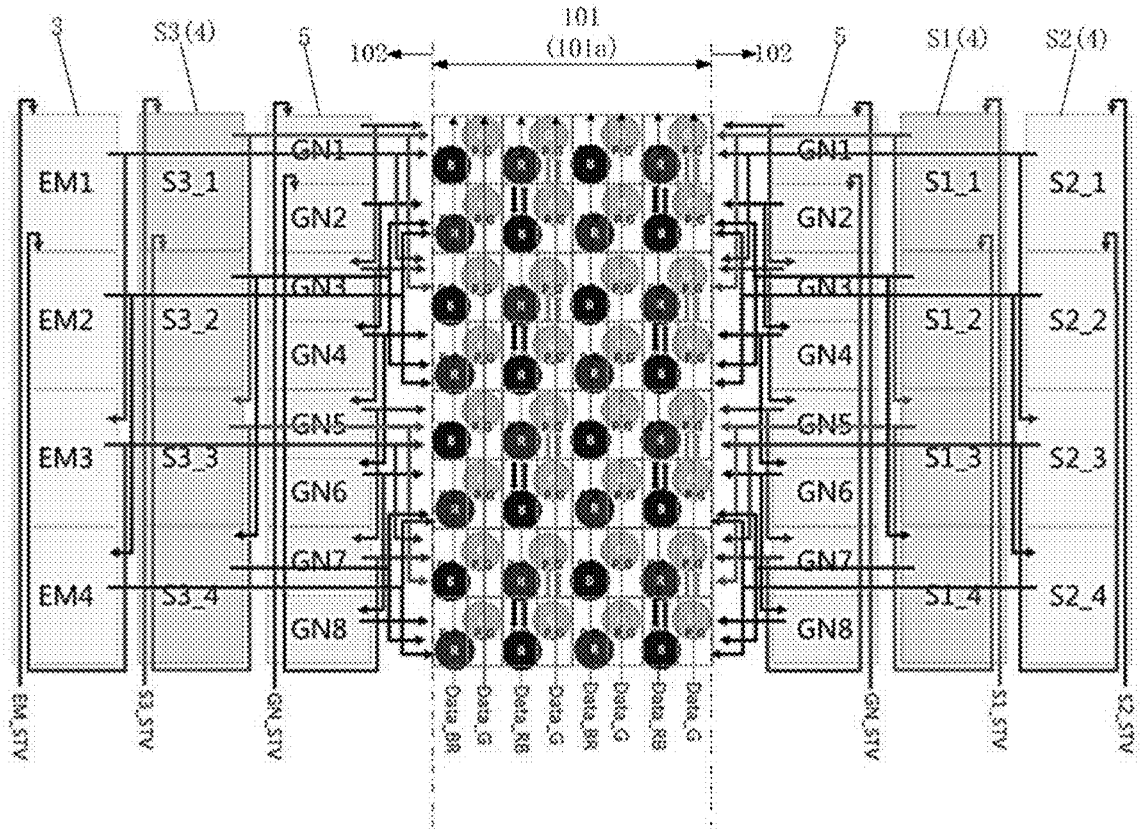
FIG. 2B is a schematic top view of another display panel according to an embodiment of the present disclosure.

To solve the problem of increased power consumption of the display panel in the foregoing embodiments, in a first aspect, an embodiment of the present disclosure further provides a display panel. Referring to FIGS. 2A and 2B, FIG. 2A is a schematic top view of a display region of another display panel according to an embodiment of the present disclosure; and FIG. 2B is a schematic top view of another display panel according to an embodiment of the present disclosure. The display panel includes a plurality of pixel units 1 arranged in an array; and a plurality of data lines 2. Each pixel unit 1 includes at least a first light-emitting element 11, two second light-emitting elements 12, and a third light-emitting element 13 which are different in color. The second light-emitting elements 12 in the pixel unit 1 are located in the same odd row and different even columns. The first light-emitting element 11 and the third light-emitting element 13 are located in the same even row and different odd columns. In the array of the pixel units 1, first light-emitting elements 11 and third light-emitting elements 13 in any two adjacent even rows are mutually staggered, and first light-emitting elements 11 and third light-emitting elements 13 in any two adjacent odd columns are mutually staggered. The first light-emitting elements 11 and the third light-emitting elements 13 in the same column are electrically connected to the same data line 2. The second light-emitting elements 12 in the same column are electrically connected to the same data line 2. The pixel unit 1 further includes a plurality of pixel circuits 100 correspond to the first light-emitting element 11, the second light-emitting elements 12, and the third light-emitting element 13 in the pixel unit 1, respectively. In the first light-emitting elements 11 and the third light-emitting elements 13 in any two adjacent odd columns, in one of the two adjacent odd columns, the pixel circuit 100 corresponding to an $n^{th}$ light-emitting element is electrically connected to an $(n+1)^{th}$ light-emitting element, and the pixel circuit 100 corresponding to an $(n+1)^{th}$ light-emitting element is electrically connected to the $n^{th}$ light-emitting element, where n is an odd number. The $n^{th}$ light-emitting element is the first light-emitting element 11 or the third light-emitting element 13, and the $(n+1)^{th}$ light-emitting element is the third light-emitting element 13 or the first light-emitting element 11.

Figure 2C:
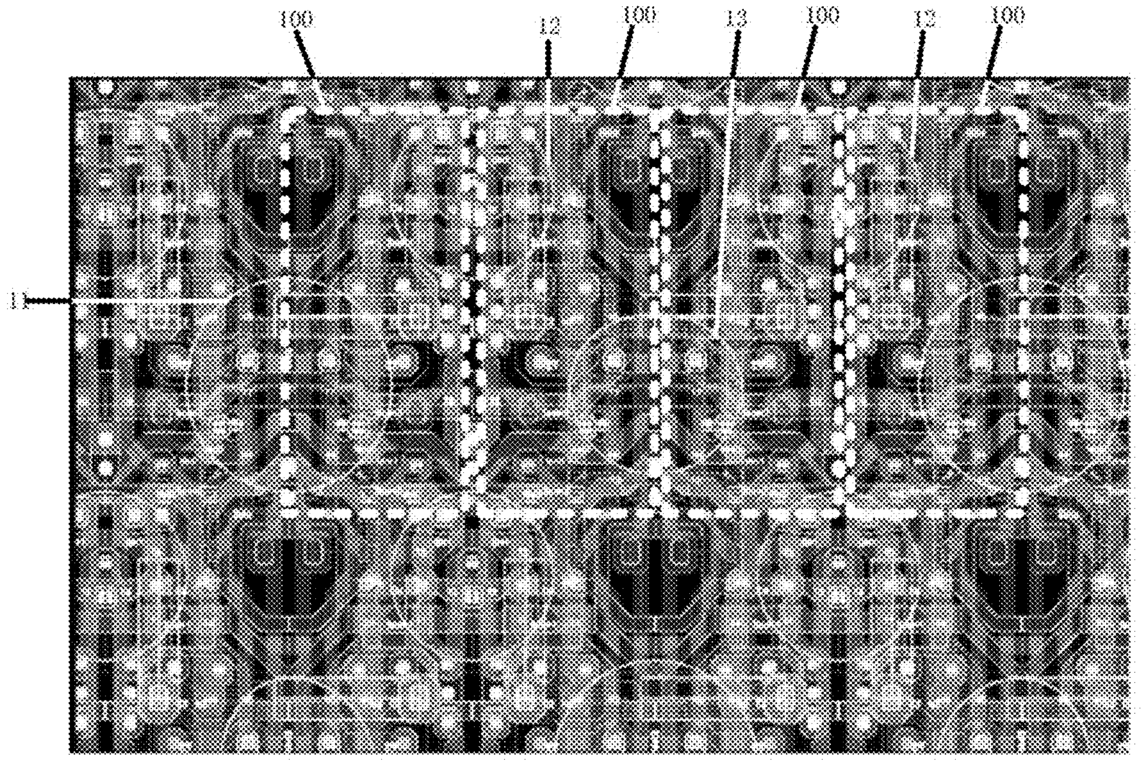
FIG. 2C is a layout illustrating a correspondence between pixel circuits and light-emitting elements in another display panel according to an embodiment of the present disclosure.

The row direction of the array is L, and the column direction is H. Referring to FIG. 2C, a layout illustrating a correspondence between pixel circuits and light-emitting elements in another display panel according to an embodiment of the present disclosure is shown. A plurality of pixel circuits 100 correspond to the first light-emitting element 11, the second light-emitting elements 12, and the third light-emitting element 13 in the pixel unit 1, respectively, which means that the pixel circuits 100 are provided at positions corresponding to the different colors of light-emitting elements in the pixel unit 1, and the corresponding positions actually refer to the case where a pair of pixel circuit 100 and light-emitting element at corresponding positions have orthographic projections on the substrate at least partially overlapped. In other words, one pixel circuit 100 and one light-emitting element or one color light-emitting element in the pixel unit 1 have orthographic projections on the substrate at least partially overlapped.

In the first light-emitting elements 11 and the third light-emitting elements 13 in any two adjacent odd columns, in one of the two adjacent odd columns, the pixel circuit 100 corresponding to an $n^{th}$ light-emitting element is electrically connected to an $(n+1)^{th}$ light-emitting element, and the pixel circuit 100 corresponding to an $(n+1)^{th}$ light-emitting element is electrically connected to the $n^{th}$ light-emitting element, so that during driving of pixel units 1 in odd rows, the display panel drives the first light-emitting elements 11 or the third light-emitting elements 13 to emit light, and during driving of pixel units 1 in even rows, the third light-emitting elements 13 or the first light-emitting elements 11 are driven to emit light. As a result, when the display panel drives at least part of the odd rows before at least part of the even rows, the data signals for driving the light-emitting elements in odd columns formed by the first light-emitting elements 11 and the third light-emitting elements 13 alternately arranged on the data lines 2 only needs to jump once, which avoids repeated jumps of the data signals on the data lines 2 when the display panel drives the pixel units 1 line by line, thereby reducing the power consumption of the display panel.

In some embodiments, referring to FIG. 2A, the plurality of pixel circuits 100 are in one-to-one correspondence with the first light-emitting element 11, the two second light-emitting elements 12, and the third light-emitting element 13 in the pixel unit 1. In the second light-emitting elements 12 in any two adjacent even columns, in one of the two adjacent even columns, the pixel circuit 100 corresponding to an $n^{th}$ second light-emitting element 12 is electrically connected to an $(n+1)^{th}$ second light-emitting element 12, and the pixel circuit 100 corresponding to an $(n+1)^{th}$ second light-emitting element 12 is electrically connected to the $n^{th}$ second light-emitting element 12, where n is an odd number.

Each pixel circuit 100 is disposed corresponding to one light-emitting element in the pixel unit 1, and accordingly, each pixel circuit 100 is electrically connected to one light-emitting element in the pixel unit 1. During display, the first light-emitting element 11 and an adjacent second light-emitting element 12 in the pixel unit 1 are taken as a subpixel unit in calculation of display brightness, and an image is displayed according to the display brightness, and during display, the third light-emitting element 13 and another adjacent second light-emitting element 12 in the pixel unit 1 are taken as a subpixel unit in calculation of display brightness, and an image is displayed according to the display brightness. In the second light-emitting elements 12 in any two adjacent even columns, in one of the two adjacent even columns, the pixel circuit 100 corresponding to an $n^{th}$ second light-emitting element 12 is electrically connected to an $(n+1)^{th}$ second light-emitting element 12, and the pixel circuit 100 corresponding to an $(n+1)^{th}$ second light-emitting element 12 is electrically connected to the $n^{th}$ second light-emitting element 12, so that the display effect of each subpixel unit in the pixel unit 1, and thus the display effect of the display panel, are improved.

In some embodiments, referring to FIG. 2A, the first light-emitting element 11 is a blue light-emitting element B, the second light-emitting element 12 is a green light-emitting element G, and the third light-emitting element 13 is a red light-emitting element R. Blue light-emitting elements B and red light-emitting elements R in the same column are electrically connected to the same data line Data_BR/Data_RB, and green light-emitting elements G in the same column are electrically connected to the same data line Data_G. In two adjacent odd columns formed by arranging the blue light-emitting elements B and the red light-emitting elements R, in one of the two adjacent odd columns, a pixel circuit P_B corresponding to an $n^{th}$ blue light-emitting element B is electrically connected to the $n^{th}$ blue light-emitting element B, while in the other column, a pixel circuit P_R corresponding to an $n^{th}$ red light-emitting element R is electrically connected to an $(n+1)^{th}$ blue light-emitting element B. In two adjacent even columns formed by arranging the green light-emitting elements G and the green light-emitting elements G, in one of the two adjacent even columns, a pixel circuit P_G corresponding to an $n^{th}$ green light-emitting element G is electrically connected to the $n^{th}$ green light-emitting element G, while in the other column, a pixel circuit P_G corresponding to an $n^{th}$ green light-emitting element R is electrically connected to an $(n+1)^{th}$ green light-emitting element G.

Figure 3:
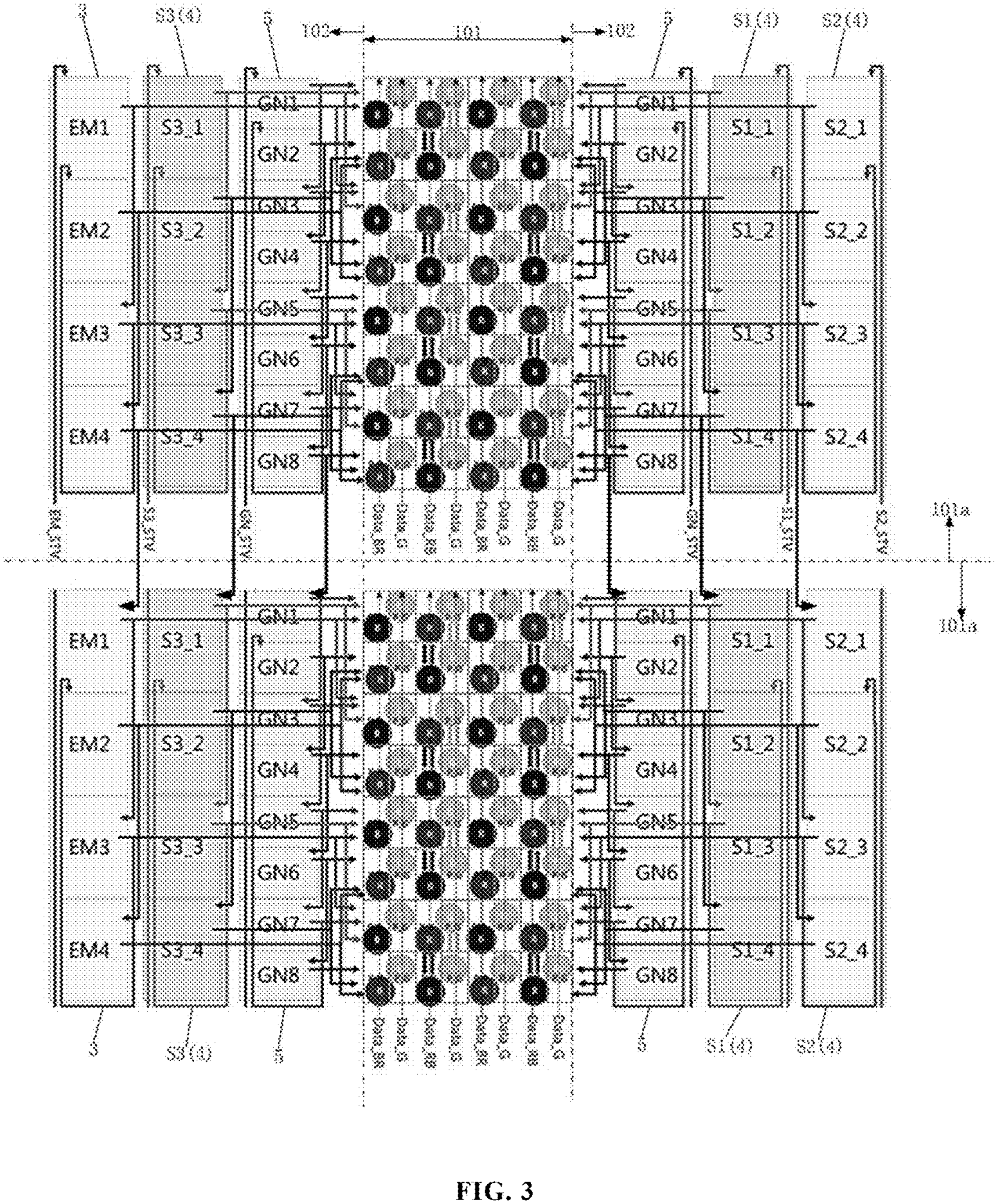
FIG. 3 is a schematic top view of yet another display panel according to an embodiment of the present disclosure.

In some embodiments, referring to FIG. 3, a schematic top view of yet another display panel according to an embodiment of the present disclosure is shown. The array of the pixel units 1 in a display region 101 includes X rows, where X≥8, and the display region 101 is divided into A subregions 101*a* sequentially arranged in a column direction H of the array. Each subregion 101*a* includes at least four rows of pixel units 1, where A is any integer in the range of 1 to X/4.

In a case where A=1, referring to FIG. 2B, the display region 101 is divided into one subregion, that is, the display region 101 is monolithic. According to the arrangement and provision of the pixel units 1 in the display region 101 of the display panel in FIG. 2B, during driving of pixel units 1 in odd rows, the display panel drives the first light-emitting elements 11 or the third light-emitting elements 13 to emit light, and during driving of pixel units 1 in even rows, the third light-emitting elements 13 or the first light-emitting elements 11 are driven to emit light, so that when the display panel drives the odd rows before the even rows, the data signals for driving the light-emitting elements in odd columns formed by the first light-emitting elements 11 and the third light-emitting elements 13 alternately arranged on the data lines 2 only needs to jump once. For example, during driving of the odd rows, the data signals for driving the light-emitting elements in odd columns formed by the first light-emitting elements 11 and the third light-emitting elements 13 alternately arranged on the data lines 2 are all data signals for driving the first light-emitting elements 11, and during driving of the even rows, the data signals for driving the light-emitting elements in odd columns formed by the first light-emitting elements 11 and the third light-emitting elements 13 alternately arranged on the data lines 2 are all data signals for driving the third light-emitting elements 13. In other words, for the whole display region 101, in the display process of one frame image, the data signals for driving the light-emitting elements in odd columns formed by the first light-emitting elements 11 and the third light-emitting elements 13 alternately arranged on the data lines 2 only needs to jump once, thereby greatly reducing the power consumption of the display panel.

In a case where A=2 or an integer greater than 2, referring to FIG. 3, the display region 101 is divided into two or more subregions. According to the arrangement and provision of the pixel units 1 in the display region 101 of the display panel in FIG. 2, for display in each subregion of the display panel, during driving of pixel units 1 in odd rows, the first light-emitting elements 11 or the third light-emitting elements 13 are driven to emit light, and during driving of pixel units 1 in even rows, the third light-emitting elements 13 or the first light-emitting elements 11 are driven to emit light. so that when the display panel drives the odd rows before the even rows in each subregion, the data signals for driving the light-emitting elements in odd columns formed by the first light-emitting elements 11 and the third light-emitting elements 13 alternately arranged on the data lines 2 only needs to jump once. For example, during driving of the odd rows in each subregion, the data signals for driving the light-emitting elements in odd columns formed by the first light-emitting elements 11 and the third light-emitting elements 13 alternately arranged on the data lines 2 are all data signals for driving the first light-emitting elements 11, and during driving of the even rows in each subregion, the data signals for driving the light-emitting elements in odd columns formed by the first light-emitting elements 11 and the third light-emitting elements 13 alternately arranged on the data lines 2 are all data signals for driving the third light-emitting elements 13. In other words, during the display process of a picture in each subregion, the data signals for driving the light-emitting elements in odd columns formed by the first light-emitting elements 11 and the third light-emitting elements 13 alternately arranged on the data lines 2 only needs to jump once, thereby reducing the power consumption of the display panel.

In some embodiments, referring to FIGS. 2B and 3, the display panel further includes at least one emission control driver circuit 3 in at least one side frame region 102, and different emission control driver circuits 3 are electrically connected to corresponding pixel circuits in different subregions 101*a*. The emission control driver circuit 3 includes a plurality of first shift registers EM in which odd first shift registers EM are sequentially cascaded, even first shift registers EM are sequentially cascaded, and an output of a last odd first shift register EM is electrically connected to an input of a first even first shift register EM. Outputs of the odd first shift registers EM are electrically connected to the pixel circuits in the pixel units 1 in odd rows, and outputs of the even first shift registers EM are electrically connected to the pixel circuits in the pixel units 1 in even rows. An output of a last first shift register EM in a previous emission control driver circuit 3 of two adjacent emission control driver circuits 3 is electrically connected to an input of a first first shift register EM in a next emission control driver circuit 3.

In some embodiments, in the emission control driver circuit 3, an output of an $N^{th}$ first shift register EMN is electrically connected to the pixel circuits in the pixel units 1 in $(2N-1)^{th}$ and $(2N+1)^{th}$ rows of the corresponding subregion 101*a*, where N is an odd number; and an output of an $M^{th}$ first shift register EMM is electrically connected to the pixel circuits in the pixel units 1 in $(2M-2)^{th}$ and $(2M)^{th}$ rows of the corresponding subregion 101*a*, where M is an even number.

In some embodiments, an input of a first first shift register EM1 in a first emission control driver circuit 3 is electrically connected to an emission control trigger signal output EM_STV.

In some embodiments, referring to FIGS. 2B and 3, the display panel further includes at least one gate driver circuit 4 in at least one side frame region 102, and different gate driver circuits 4 are electrically connected to corresponding pixel circuits in different subregions 101*a*. The gate driver circuit 4 includes a plurality of second shift registers in which odd second shift registers are sequentially cascaded, even second shift registers are sequentially cascaded, and an output of a last odd second shift register is electrically connected to an input of a first even second shift register. Outputs of the odd second shift registers are electrically connected to the pixel circuits in the pixel units 1 in odd rows, and outputs of the even second shift registers are electrically connected to the pixel circuits in the pixel units 1 in even rows. An output of a last second shift register in a previous gate driver circuit 4 of two adjacent gate driver circuits 4 is electrically connected to an input of a first second shift register in a next gate driver circuit 4.

In some embodiments, in the gate driver circuit 4, an output of an $N^{th}$ second shift register S_N is electrically connected to the pixel circuits in the pixel units 1 in $(2N-1)^{th}$ and $(2N+1)^{th}$ rows of the corresponding subregion 101*a*, where N is an odd number; and an output of an $M^{th}$ second shift register S_M is electrically connected to the pixel circuits in the pixel units 1 in $(2M-2)^{th}$ and $(2M)^{th}$ rows of the corresponding subregion 101*a*, where M is an even number.

In some embodiments, an input of a first second shift register in a first gate driver circuit 4 is electrically connected to a gate drive trigger signal output.

In some embodiments, the gate driver circuit 4 includes a first gate driver circuit S1, a second gate driver circuit S2, and a third gate driver circuit S3. An input of a first second shift register S1_1 in a first first gate driver circuit S1 is electrically connected to a first gate drive trigger signal output S1_STV. An input of a first second shift register S2_1 in a first second gate driver circuit S2 is electrically connected to a second gate drive trigger signal output S2_STV. An input of a first third shift register S3_1 in a first second gate driver circuit S3 is electrically connected to a third gate drive trigger signal output S3_STV.

In some embodiments, referring to FIGS. 2B and 3, the display panel further includes at least a pair of fourth gate driver circuits 5 in two opposite side frame regions 102, and different fourth gate driver circuits 5 in the same side frame region 102 are electrically connected to corresponding pixel circuits in different subregions 101*a*. Each fourth gate driver circuit 5 includes a plurality of third shift registers GN in which odd third shift registers GN are sequentially cascaded, even third shift registers GN are sequentially cascaded, and an output of a last odd third shift register GN is electrically connected to an input of a first even third shift register GN. Outputs of the odd third shift registers GN are electrically connected to the pixel circuits in the pixel units 1 in odd rows, and outputs of the even third shift registers GN are electrically connected to the pixel circuits in the pixel units 1 in even rows. An output of a last third shift register GN in a previous fourth gate driver circuit 5 of two adjacent fourth gate driver circuits 5 in the same side frame region 102 is electrically connected to an input of a first third shift register GN in a next fourth gate driver circuit 5.

In some embodiments, in each fourth gate driver circuit 5, an output of an $N^{th}$ third shift register GNN is electrically connected to the pixel circuits in the pixel units 1 in an $N^{th}$ row of the corresponding subregion 101*a*, where N is an odd number; and an output of an $M^{th}$ third shift register GNM is electrically connected to the pixel circuits in the pixel units 1 in an $M^{th}$ row of the corresponding subregion 101*a*, where M is an even number.

In some embodiments, an input of a first third shift register GN1 in a first fourth gate driver circuit 5 in the same side frame region 102 is electrically connected to a fourth gate drive trigger signal output GN_STV.

Figure 4:
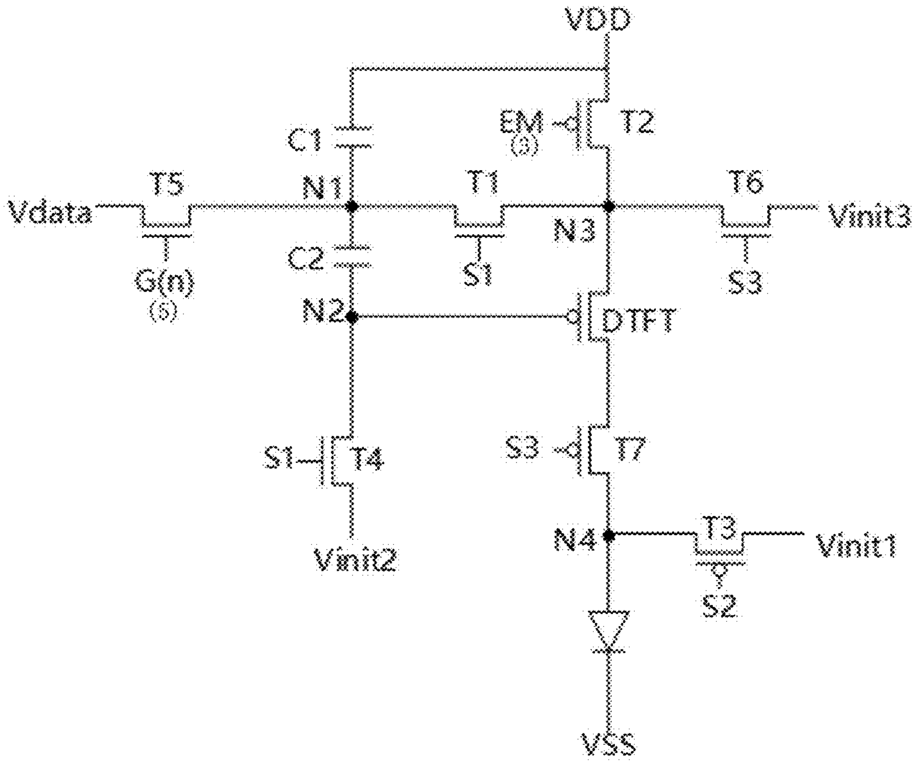
FIG. 4 is a circuit diagram of a pixel circuit according to an embodiment of the present disclosure.

In some embodiments, referring to FIG. 4, a circuit diagram of a pixel circuit according to an embodiment of the present disclosure is shown. Each of the first light-emitting element 11, the second light-emitting element 12, and the third light-emitting element 13 includes an anode, an emission functional layer and a cathode sequentially arranged in a superimposed manner. Each pixel circuit includes a first transistor T1, a second transistor T2, a third transistor T3, a fourth transistor T4, a fifth transistor T5, a sixth transistor T6, a seventh transistor T7, a drive transistor DTFT, a first capacitor C1 and a second capacitor C2. A first electrode of the first transistor T1, a first electrode of the second transistor T2, a first electrode of the sixth transistor T6, and a first electrode of the drive transistor DTFT are connected at a third node N3, a second electrode of the first transistor T1, a first electrode of the fifth transistor T5, a first plate of the first capacitor C1, and a first plate of the second capacitor C2 are connected at a first node N1, a second plate of the second capacitor C2, a gate of the drive transistor DTFT, and a first electrode of the fourth transistor T4 are connected at a second node N2, a first electrode of the seventh transistor T7, a first electrode of the third transistor T3, and the anode are connected at a fourth node N4, a second electrode of the second transistor T2 and the second plate of the first capacitor C1 are connected to a first power VDD, a second electrode of the fifth transistor T5 is connected to the corresponding data line Vdata, a second electrode of the sixth transistor T6 is connected to a third reset power Vinit3, a second electrode of the fourth transistor T4 is connected to a second reset power Vinit2, a second electrode of the drive transistor DTFT is connected to a second electrode of the seventh transistor T7, a second electrode of the third transistor T3 is connected to a first reset power Vinit1, and the cathode is connected to a second power VSS. A gate of the first transistor T1 and a gate of the fourth transistor T4 are connected to the first gate driver circuit S1, a gate of the third transistor T3 is connected to the second gate driver circuit S2, a gate of the sixth transistor T6 and a gate of the seventh transistor T7 are connected to the third gate driver circuit S3, a gate of the second transistor T2 is connected to the emission control driver circuit EM(3), and a gate of the fifth transistor T5 is connected to the fourth gate driver circuits G(n)(5).

In some embodiments, in addition to the 8T2C (i.e., eight transistors and two capacitors) structure shown in FIG. 4, the pixel circuit may have a circuit structure including other numbers of transistors and capacitors, such as 7T1C, 7T2C, 6T1C, 6T2C, or 9T2C, or the like, which is not limited in the embodiments of the present disclosure.

The circuit structures of the pixel circuit listed above are all mature conventional circuits, and the specific working processes thereof are not described in detail here.

In some embodiments, referring to FIG. 4, the pixel circuits in the subregions 101*a* are driven in sequence under the driving of the first gate driver circuit S1, the second gate driver circuit S2, the third gate driver circuit S3, the emission control driver circuit EM(3), and the fourth gate driver circuit G(n)(5). During driving of the pixel circuits in any subregion 101*a*, firstly the pixel circuits in odd rows in the subregion 101*a* are driven in sequence, and then the pixel circuits in even rows in the subregion 101*a* are driven in sequence. For pixel circuits in odd rows of any subregion 101*a*, two or more rows may be driven simultaneously, or the pixel circuits may be driven line by line. For pixel circuits in even rows of any subregion 101*a*, two more or rows may be driven simultaneously, or the pixel circuits may be driven line by line. In this manner, during the display process of a picture in each subregion 101*a*, the data signals for driving the light-emitting elements in odd columns formed by the first light-emitting elements 11 and the third light-emitting elements 13 alternately arranged on the data lines 2 only needs to jump once, so that the number of jumps of the data signals over the data lines 2 is reduced, which further reduces the power consumption of each subregion 101*a* during display, and finally reduces the power consumption of the whole display panel.

Figure 5A:
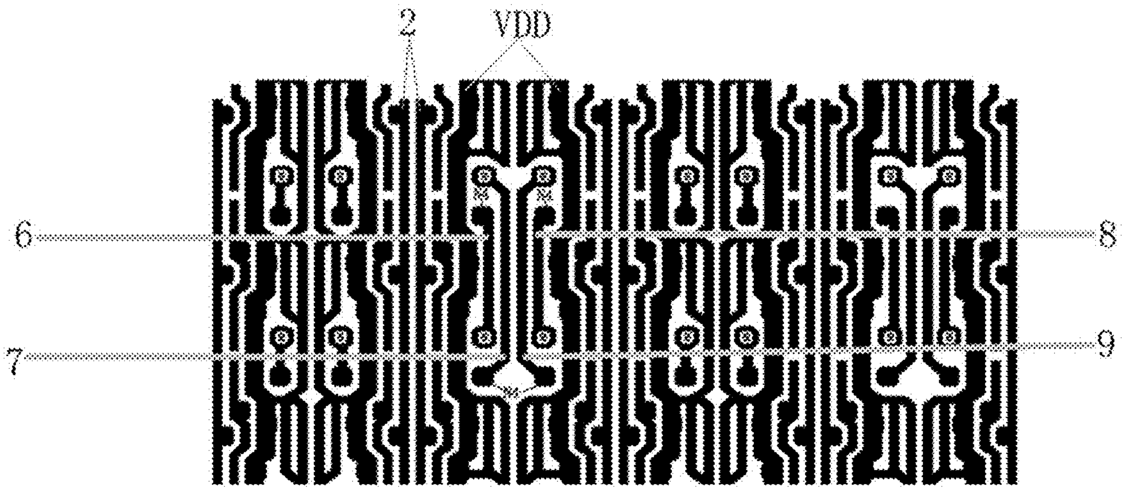
FIG. 5A is a layout illustrating a local structure of a conductive layer in a display panel according to an embodiment of the present disclosure.
Figure 5B:
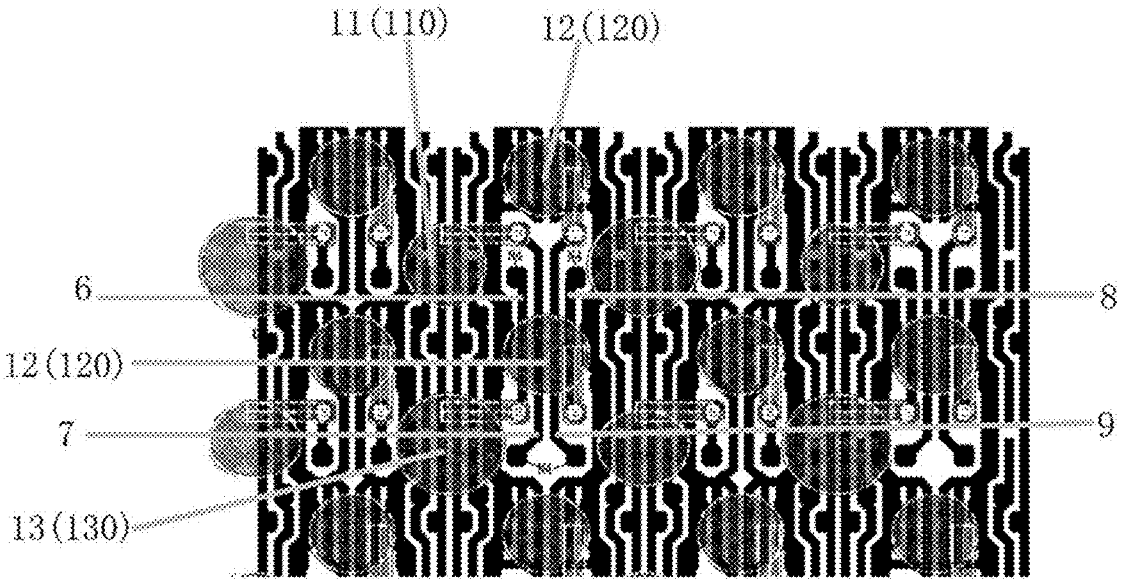
FIG. 5B is a layout illustrating a local structure of a conductive layer and an anode in a display panel according to an embodiment of the present disclosure.

In some embodiments, referring to FIG. 5A, a layout illustrating a local structure of a conductive layer in a display panel according to an embodiment of the present disclosure is shown, and FIG. 5B is a layout illustrating a local structure of a conductive layer and an anode in a display panel according to an embodiment of the present disclosure. The first light-emitting element 11 includes a first anode 110, the third light-emitting element 13 includes a third anode 130, and the first anode 110 and the third anode 130 are disposed in the same layer. The fourth node N4 of the pixel circuit corresponding to an $n^{th}$ first light-emitting element 11 is connected to the third anode 130 of an $(n+1)^{th}$ third light-emitting element 13 through a first lead 6. The fourth node N4 of the pixel circuit corresponding to the $(n+1)^{th}$ third light-emitting element 13 is connected to the first anode 110 of the $n^{th}$ first light-emitting element 11 through a second lead 7.

In some embodiments, referring to FIGS. 2A, 2B and 3, the lower arrow between the first light-emitting element 11 and the third light-emitting element 13 in an odd column schematically indicates that the pixel circuit 100 corresponding to the third light-emitting element 13 in an upper row is electrically connected to the first light-emitting element 11 in a lower row through a first lead 6; and the upper arrow between the first light-emitting element 11 and the third light-emitting element 13 in an odd column schematically indicates that the pixel circuit 100 corresponding to the first light-emitting element 11 in a lower row is electrically connected to the third light-emitting element 13 in an upper row through a second lead 7.

In some embodiments, each pixel circuit includes a plurality of conductive layers, and the first lead 6 and the second lead 7 are disposed in the same layer and located in any one of the conductive layers. In other words, the connection between the fourth node N4 of the pixel circuit corresponding to the $n^{th}$ first light-emitting element 11 and the third anode 130 of the $(n+1)^{th}$ third light-emitting element 13 is achieved through the first lead 6 and a via in an insulation layer between the anode layer and the conductive layer where the first lead 6 is located, and the connection between the fourth node N4 of the pixel circuit corresponding to the $(n+1)^{th}$ third light-emitting element 13 and the first anode 110 of the $n^{th}$ first light-emitting element 11 is achieved through the second lead 7 and a via in the insulation layer between the anode layer and the conductive layer where the second lead 7 is located.

In some embodiments, referring to FIGS. 5A and 5B, the second light-emitting element 12 includes a second anode 120 disposed in the same layer as the first anode 110 and the third anode 130. The fourth node N4 of the pixel circuit corresponding to an $n^{th}$ second light-emitting element 12 is connected to the second anode 120 of an $(n+1)^{th}$ second light-emitting element 12 through a third lead 8. The fourth node N4 of the pixel circuit corresponding to the $(n+1)^{th}$ second light-emitting element 12 is connected to the second anode 120 of the $n^{th}$ second light-emitting element 12 through a fourth lead 9.

In some embodiments, referring to FIGS. 2A, 2B and 3, the lower arrow between the second light-emitting element 12 and the second light-emitting element 12 in an even column schematically indicates that the pixel circuit 100 corresponding to the second light-emitting element 12 in an upper row is electrically connected to the second light-emitting element 12 in a lower row through a third lead 8; and the upper arrow between the second light-emitting element 12 and the second light-emitting element 12 in an even column schematically indicates that the pixel circuit 100 corresponding to the second light-emitting element 12 in a lower row is electrically connected to the second light-emitting element 12 in an upper row through a fourth lead 9.

In some embodiments, the third lead 8 and the fourth lead 9 are disposed in the same layer as the first lead 6 and the second lead 7, and the first lead 6, the second lead 7, the third lead 8, and the fourth lead 9 each extend in the column direction H of the array, and are sequentially arranged in a row direction L of the array.

In some embodiments, the first lead 6 and the second lead 7 are mirror symmetric to the third lead 8 and the fourth lead 9.

According to the display panel provided in the embodiments of the present disclosure, in the first light-emitting elements 11 and the third light-emitting elements 13 in any two adjacent odd columns, in one of the two adjacent odd columns, the pixel circuit corresponding to an $n^{th}$ first light-emitting element 11 is electrically connected to an $(n+1)^{th}$ third light-emitting element 13, and the pixel circuit corresponding to an $(n+1)^{th}$ third light-emitting element 13 is electrically connected to the $n^{th}$ first light-emitting element 11, so that during driving of pixel units 1 in odd rows, the display panel drives the first light-emitting elements 11 or the third light-emitting elements 13 to emit light, and during driving of pixel units 1 in even rows, the third light-emitting elements 13 or the first light-emitting elements 11 are driven to emit light. As a result, when the display panel drives at least part of the odd rows before at least part of the even rows, the data signals for driving the light-emitting elements in odd columns formed by the first light-emitting elements 11 and the third light-emitting elements 13 alternately arranged on the data lines 2 only needs to jump once, which avoids repeated jumps of the data signals on the data lines 2 when the display panel drives the pixel units 1 line by line, thereby reducing the power consumption of the display panel.

Based on the above structure of the display panel, an embodiment of the present disclosure further provides a driving method for the display panel, including: dividing a display region into A subregions, wherein A is any integer in the range of 1 to X/4, X is a total number of rows in an array of pixel units in the display region, and X≥8, and the driving method includes sequentially driving the pixel units in each subregion to display, when the pixel units in each subregion are driven to display, the pixel units in odd rows are scanned during a previous (1/2A) frame, data signals for driving a first light-emitting element to emit light are input to odd data lines, and data signals for driving a second light-emitting element to emit light are input to even data lines; and the pixel units in even rows are scanned during a next (1/2A) frame, data signals for driving a third light-emitting element to emit light are input to odd data lines, and data signals for driving a second light-emitting element to emit light are input to even data lines.

In some embodiments, in a case where A=1, the pixel units in odd rows in the display region are scanned during a first half of a frame, data signals for driving a first light-emitting element to emit light are input to odd data lines, and data signals for driving a second light-emitting element to emit light are input to even data lines; and the pixel units in even rows are scanned during a second half of the frame, data signals for driving a third light-emitting element to emit light are input to odd data lines, and data signals for driving a second light-emitting element to emit light are input to even data lines. In this manner, the number of jumps of the data signals over the data lines 2 is significantly reduced, and compared with the mode in which data signals for the light-emitting elements in odd columns of the display panel in FIG. 1 are repeatedly switched between the first light-emitting elements and the third light-emitting elements along with the progressive scanning of the gate driver circuit, the jump parasitic of data signals between adjacent data lines in a fanout region of the display panel can be effectively reduced, thereby improving the bright and dark display flicker in the fanout region of the display panel and the display effect of the display panel.

The driving method for the display panel of the present disclosure enables sequential driving of the pixel units in odd rows and in even rows in each subregion, and in the driving process of the odd rows in each subregion, the data signals for driving the light-emitting elements in odd columns formed by the first light-emitting elements and the third light-emitting elements alternately arranged on the data lines are all data signals for driving the first light-emitting elements or the third light-emitting elements, while in the driving process of the even rows in each subregion, the data signals for driving the light-emitting elements in odd columns formed by the first light-emitting elements and the third light-emitting elements alternately arranged on the data lines are all data signals for driving the third light-emitting elements or the first light-emitting elements. In other words, during the display process of a picture in each subregion, the data signals for driving the light-emitting elements in odd columns formed by the first light-emitting elements and the third light-emitting elements alternately arranged on the data lines only needs to jump once, so that the number of jumps of the data signals over the data lines is reduced, which reduces the power consumption of each subregion during display, thereby reducing the power consumption of the display panel.

In a second aspect, an embodiment of the present disclosure further provides a display apparatus including the display panel according to any of the above embodiments.

By adopting the display panel in any of the above embodiments, the power consumption of the display apparatus is reduced.

The display apparatus in the embodiments of the present disclosure may be an OLED panel, an OLED television, an OLED billboard, a monitor, a mobile phone, a navigator, or any product or component with a display function.

It will be appreciated that the above implementations are merely exemplary implementations for the purpose of illustrating the principle of the present disclosure, and the present disclosure is not limited thereto. Various modifications and improvements can be made by those skilled in the art without departing from the spirit and essence of the disclosure. Accordingly, all of the modifications and improvements also fall into the protection scope of the present disclosure.

What is claimed is:

1. A display panel, comprising a plurality of pixel units arranged in an array; wherein each pixel unit comprises at least a first light-emitting element, two second light-emitting elements, and a third light-emitting element which are different in color;

the second light-emitting elements in the pixel unit are in a same odd row and different even columns, and the first light-emitting element and the third light-emitting element are in a same even row and different odd columns, in the array of the pixel units, first light-emitting elements and third light-emitting elements in any two adjacent even rows are mutually staggered, and first light-emitting elements and third light-emitting elements in any two adjacent odd columns are mutually staggered, first light-emitting elements and third light-emitting elements in a same column are electrically connected to a same data line; second light-emitting elements in a same column are electrically connected to a same data line;

each pixel unit further comprises a plurality of pixel circuits correspond to the first light-emitting element, the second light-emitting elements, and the third light-emitting element in the pixel unit, respectively, and in the first light-emitting elements and the third light-emitting elements in any two adjacent odd columns, in one of the two adjacent odd columns, the pixel circuit corresponding to an $n^{th}$ light-emitting element is electrically connected to an $(n+1)^{th}$ light-emitting element, and the pixel circuit corresponding to an $(n+1)^{th}$ light-emitting element is electrically connected to the $n^{th}$ light-emitting element, where n is an odd number; and the $n^{th}$ light-emitting element is the first light-emitting element or the third light-emitting element, and the $(n+1)^{th}$ light-emitting element is the third light-emitting element or the first light-emitting element.

2. The display panel according to claim 1, wherein the plurality of pixel circuits correspond to the first light-emitting element, the two second light-emitting elements, and the third light-emitting element in the pixel unit one by one, and in the second light-emitting elements in any two adjacent even columns, in one of the two adjacent even columns, the pixel circuit corresponding to an $n^{th}$ second light-emitting element is electrically connected to an $(n+1)^{th}$ second light-emitting element, and the pixel circuit corresponding to an $(n+1)^{th}$ second light-emitting element is electrically connected to the $n^{th}$ second light-emitting element, where n is an odd number.

3. The display panel according to claim 1, wherein the array of the pixel units in a display region comprises X rows, where X≥8, and the display region is divided into A subregions sequentially arranged in a column direction of the array, each subregion comprising at least four rows of pixel units, where A is any integer in a range of 1 to X/4.

4. The display panel according to claim 3, further comprising at least one emission control driver circuit in at least one side frame region, and different emission control driver circuits are electrically connected to corresponding pixel circuits in different subregions, the emission control driver circuit comprises a plurality of first shift registers in which odd first shift registers are sequentially cascaded, even first shift registers are sequentially cascaded, and an output of a last odd first shift register is electrically connected to an input of a first even first shift register, outputs of the odd first shift registers are electrically connected to the pixel circuits in the pixel units in odd rows, outputs of the even first shift registers are electrically connected to the pixel circuits in the pixel units in even rows; and an output of a last first shift register in a previous emission control driver circuit of two adjacent emission control driver circuits is electrically connected to an input of a first first shift register in a next emission control driver circuit.

5. The display panel according to claim 4, wherein in the emission control driver circuit, an output of an $N^{th}$ first shift register is electrically connected to the pixel circuits in the pixel units in $(2N-1)^{th}$ and $(2N+1)^{th}$ rows of the corresponding subregion, where N is an odd number; and an output of an $M^{th}$ first shift register is electrically connected to the pixel circuits in the pixel units in $(2M-2)^{th}$ and $(2M)^{th}$ rows of the corresponding subregion, where M is an even number.

6. The display panel according to claim 5, wherein an input of a first first shift register in a first emission control driver circuit is electrically connected to an emission control trigger signal output.

7. The display panel according to claim 3, further comprising at least one gate driver circuit in at least one side frame region, and different gate driver circuits are electrically connected to corresponding pixel circuits in different subregions, the gate driver circuit comprises a plurality of second shift registers in which odd second shift registers are sequentially cascaded, even second shift registers are sequentially cascaded, and an output of a last odd second shift register is electrically connected to an input of a first even second shift register, outputs of the odd second shift registers are electrically connected to the pixel circuits in the pixel units in odd rows, outputs of the even second shift registers are electrically connected to the pixel circuits in the pixel units in even rows; and an output of a last second shift register in a previous gate driver circuit of two adjacent gate driver circuits is electrically connected to an input of a first second shift register in a next gate driver circuit.

8. The display panel according to claim 7, wherein in the gate driver circuit, an output of an $N^{th}$ second shift register is electrically connected to the pixel circuits in the pixel units in $(2N-1)^{th}$ and $(2N+1)^{th}$ rows of the corresponding subregion, where N is an odd number; and an output of an $M^{th}$ second shift register is electrically connected to the pixel circuits in the pixel units in $(2M-2)^{th}$ and $(2M)^{th}$ rows of the corresponding subregion, where M is an even number.

9. The display panel according to claim 8, wherein an input of a first second shift register in a first gate driver circuit is electrically connected to a gate drive trigger signal output.

10. The display panel according to claim 9, wherein the gate driver circuit comprises a first gate driver circuit, a second gate driver circuit, and a third gate driver circuit;

an input of a first second shift register in a first first gate driver circuit is electrically connected to a first gate drive trigger signal output;

an input of a first second shift register in a first second gate driver circuit is electrically connected to a second gate drive trigger signal output; and an input of a first second shift register in a first third gate driver circuit is electrically connected to a third gate drive trigger signal output.

11. The display panel according to claim 3, further comprising at least a pair of fourth gate driver circuits in two opposite side frame regions, and different fourth gate driver circuits in the same side frame region are electrically connected to corresponding pixel circuits in different subregions, each fourth gate driver circuit comprises a plurality of third shift registers in which odd third shift registers are sequentially cascaded, even third shift registers are sequentially cascaded, and an output of a last odd third shift register is electrically connected to an input of a first even third shift register, outputs of the odd third shift registers are electrically connected to the pixel circuits in the pixel units in odd rows, outputs of the even third shift registers are electrically connected to the pixel circuits in the pixel units in even rows; and an output of a last third shift register in a previous fourth gate driver circuit of two adjacent fourth gate driver circuits in the same side frame region is electrically connected to an input of a first third shift register in a next fourth gate driver circuit.

12. The display panel according to claim 11, wherein in each fourth gate driver circuit, an output of an $N^{th}$ third shift register is electrically connected to the pixel circuits in the pixel units in an $N^{th}$ row of the corresponding subregion, where N is an odd number; and an output of an $M^{th}$ third shift register is electrically connected to the pixel circuits in the pixel units in an $M^{th}$ row of the corresponding subregion, where M is an even number.

13. The display panel according to claim 12, wherein an input of a first third shift register in a first fourth gate driver circuit in the same side frame region is electrically connected to a fourth gate drive trigger signal output.

14. The display panel according to claim 2, wherein each of the first light-emitting element, the second light-emitting element, and the third light-emitting element comprises an anode, an emission functional layer and a cathode sequentially arranged in a superimposed manner, each pixel circuit comprises a first transistor, a second transistor, a third transistor, a fourth transistor, a fifth transistor, a sixth transistor, a seventh transistor, a drive transistor, a first capacitor and a second capacitor, a first electrode of the first transistor, a first electrode of the second transistor, a first electrode of the sixth transistor, and a first electrode of the drive transistor are connected at a third node, a second electrode of the first transistor, a first electrode of the fifth transistor, a first plate of the first capacitor, and a first plate of the second capacitor are connected at a first node, a second plate of the second capacitor, a gate of the drive transistor, and a first electrode of the fourth transistor are connected at a second node, a first electrode of the seventh transistor, a first electrode of the third transistor, and the anode are connected at a fourth node, a second electrode of the second transistor and a second plate of the first capacitor are connected to a first power, a second electrode of the fifth transistor is connected to the corresponding data line, a second electrode of the sixth transistor is connected to a third reset power, a second electrode of the fourth transistor is connected to a second reset power, a second electrode of the drive transistor is connected to a second electrode of the seventh transistor, a second electrode of the third transistor is connected to a first reset power, and the cathode is connected to a second power;

a gate of the first transistor and a gate of the fourth transistor are connected to the first gate driver circuit, a gate of the third transistor is connected to the second gate driver circuit, a gate of the sixth transistor and a gate of the seventh transistor are connected to the third gate driver circuit, a gate of the second transistor is connected to the emission control driver circuit, and a gate of the fifth transistor is connected to the fourth gate driver circuits.

15. The display panel according to claim 14, wherein the first light-emitting element comprises a first anode, the third light-emitting element comprises a third anode, and the first anode and the third anode are in a same layer, the fourth node of the pixel circuit corresponding to an $n^{th}$ first light-emitting element is connected to the third anode of an $(n+1)^{th}$ third light-emitting element through a first lead, and the fourth node of the pixel circuit corresponding to the $(n+1)^{th}$ third light-emitting element is connected to the first anode of the $n^{th}$ first light-emitting element through a second lead.

16. The display panel according to claim 15, wherein each pixel circuit comprises a plurality of conductive layers, and the first lead and the second lead are in the same layer and in any one of the conductive layers.

17. The display panel according to claim 16, wherein each second light-emitting element comprises a second anode in the same layer as the first anode and the third anode, the fourth node of the pixel circuit corresponding to an $n^{th}$ second light-emitting element is connected to the second anode of an $(n+1)^{th}$ second light-emitting element through a third lead, and the fourth node of the pixel circuit corresponding to an $(n+1)^{th}$ second light-emitting element is connected to the second anode of an $n^{th}$ second light-emitting element through a fourth lead.

18. The display panel according to claim 17, wherein the third and fourth leads are in the same layer as the first and second leads, and the first, second, third and fourth leads each extend along the column direction of the array, and are sequentially arranged in a row direction of the array.

19. A display apparatus, comprising the display panel according to claim 1.

20. A driving method for the display panel according to claim 1, comprising: dividing a display region into A subregions, wherein A is any integer in a range of 1 to X/4, X is a total number of rows in an array of pixel units in the display region, and X≥8, and the driving method comprises sequentially driving the pixel units in each subregion to display, when the pixel units in each subregion are driven to display, the pixel units in odd rows are scanned during a previous (1/2A) frame, data signals for driving a first light-emitting element to emit light are input to odd data lines, and data signals for driving a second light-emitting element to emit light are input to even data lines; and the pixel units in even rows are scanned during a next (1/2A) frame, data signals for driving a third light-emitting element to emit light are input to odd data lines, and data signals for driving the second light-emitting element to emit light are input to even data lines.

* * * * *